United States Patent [19]

Ueno et al.

[11] 4,004,413
[45] Jan. 25, 1977

[54] COMBUSTIBLE MIXTURE SUPPLY SYSTEM

[75] Inventors: Zene Ueno, Fuchu; Tadahiko Nagaoka, Tokorozawa, both of Japan

[73] Assignee: Nissan Motor Co., Ltd., Yokohama, Japan

[22] Filed: Nov. 27, 1973

[21] Appl. No.: 419,193

[30] Foreign Application Priority Data

Nov. 28, 1972  Japan .............................. 47-119198
Dec. 15, 1972  Japan ....................... 47-144141[U]

[52] U.S. Cl. .................... 60/39.46 M; 60/DIG. 11; 123/1 A; 123/3; 123/119 E
[51] Int. Cl.² ...................... F02C 3/20; F02G 1/00
[58] Field of Search ....... 123/1 A, 119 E, 3, 32 ST; 60/DIG. 11, 39.46 M, 39.01, 39.61, 39.70

[56] References Cited

UNITED STATES PATENTS

| | | | |
|---|---|---|---|
| 2,862,482 | 12/1958 | Hart | 123/119 E X |
| 3,556,066 | 1/1971 | Muirhead et al. | 123/119 E X |
| 3,792,581 | 2/1974 | Handa | 60/39.02 |
| 3,846,979 | 11/1974 | Pfefferle | 60/39.65 |
| 3,872,664 | 3/1975 | Lohmann | 60/39.65 |

*Primary Examiner*—Charles J. Myhre
*Assistant Examiner*—Ira S. Lazarus

[57] ABSTRACT

An oxidizer other than air is decomposed, ignited in combination with a fuel, and fed into a combustion chamber to promote combustion of a main air-fuel mixture, the oxidizer or oxidizing agent does not contain nitrogen, and combustion of the mixture in the combustion chamber produces low levels of nitrogen oxides and other pollutants.

8 Claims, 3 Drawing Figures

COMBUSTIBLE MIXTURE SUPPLY SYSTEM

This invention relates to a combustible mixture supply system especially suited to combustion engines such as reciprocating piston engines, rotary engines, gas-turbine engines and vapor engines.

With existing combustion engines which generate mechanical power from energy produced by combustion of a fuel, it is the general practice to utilize air to supply oxygen required for the combustion of the fuel. However, the use of air as a source of oxygen invariably results in production of noxious nitrogen oxides, since nitrogen gas which occupies 4/5 of the volume of the air is oxidized during the combustion reaction, and the exhaust gas from the engine thus contributes to air pollution.

The invention contemplates to suppress generation of noxious pollutants such as hydrocarbons, carbon monoxide and nitrogen oxides which would be emitted from the engine if air was used as the sole oxydizing agent, by providing a source of an oxidizer other than air.

The basic concept underlying the invention is to therefore burn a portion of fuel using an oxidizer which does not contain nitrogen. In this way, noxious nitrogen oxides cannot be formed.

As will be understood from consideration of chemical principles, using an oxidizer such as liquid hydrogen peroxide or its decomposed gas ($H_2O + ½ O_2$), combustion of various hydrocarbon fuels can be effected almost completely, holding the concentration of nitrogen oxides including nitrogen monoxide in the engine exhaust gas to a minimum level (2 to 3 ppm, which is about 1/100 to 1/1000 of the nitrogen oxide level usually emitted from existing combustion engines). Engine systems which do not use air as an oxygen source have thus far had limited applications, such as in $H_2O$ engines, space engines and rocket engines.

The present invention, however, provides a method by which an oxidizer other than air can be used not only in the special engines mentioned above, but also in engines in common use such as reciprocating piston engines and rotary engines, in external combustion engines such as steam engines, and in boilers for other applications. For the sake of simplicity, a combustible mixture supply system of the invention will be described as supplying fuel into an internal combustion engine such as employed to drive a motor vehicle.

It is therefore an object of the invention to provide a combustible mixture supply system which uses an oxidizer other than air to supply a combustible mixture into a combustion chamber, which produces a minimal amount of nitrogen oxides when burned therein.

This and other objects of the invention will become more clear from the following description taken in conjunction with the accompanying drawings, wherein like numerals designate like parts and in which.

Figure 1:
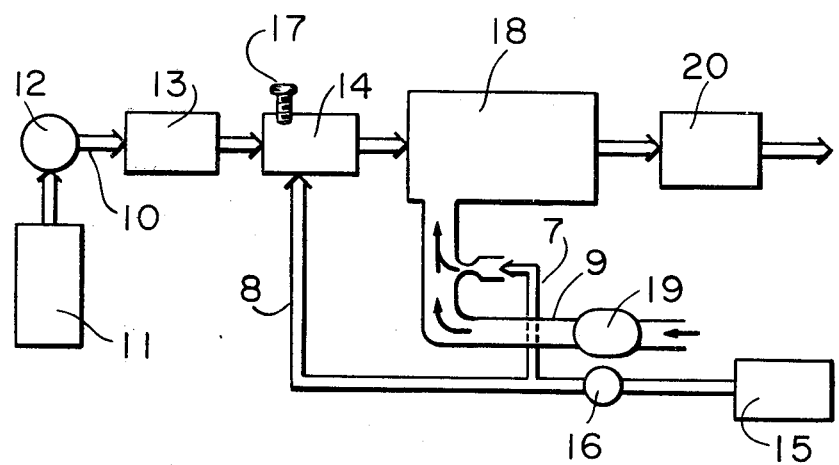
FIG. 1 is a diagrammatic view of an embodiment of a combustible mixture supply system according to the invention.

Referring to FIG. 1, there is shown a preferred embodiment of the invention, the principles of which can be applied to engines such as gas-turbine engines and vapor engines. A reference numeral 11 designates a source of oxidizer or a source of oxidizing agent, here being hydrogen peroxide of a concentration from 30 to 100%. Hydrogen peroxide from the source 11 is fed by means of an oxidizer pump 12 into a reaction chamber 13, which is provided with a catalyst such as a wire mesh of silver or copper. The catalyst decomposes hydrogen peroxide passing therethrough into $H_2O$ and ½ $O_2$ (elemental oxygen) through an exothermic reaction at about 600° to 700° C. The chamber 13 is connected to a preliminary combustor 14, in which the decomposed hydrogen peroxide gas from the chamber 13 is mixed with hydrocarbon fuel fed thereinto under pressure from a source of fuel 15 by means of a fuel pump 16. The preliminary combustor 14 is provided with an ignition means 17 for igniting the mixture of decomposed hydrogen peroxide gas and the fuel therein. The hot gas resulting from preliminary combustion in the combustor 14 is fed into a main combustion chamber 18 for burning therein in combination with a mixture of air from an air compressor 19 and more hydrocarbon fuel from the source 15. A reference numeral 20 indicates an internal combustion engine such as a turbine driven by hot gas from the main combustion chamber 18.

A main induction passageway 9, in which the compressor 19 is disposed, is used to channel atmospheric air into the combustion chamber 18. A first fuel passageway 7 leads from the source of fuel 15 into the main induction passageway 9 to supply fuel thereinto.

Fuel from the source 15 is supplied into the combustor 14 through a second fuel passageway 8, and oxidizer is supplied from the source 11 into the combustor 14 through a secondary induction passageway 10, in which the reaction chamber 13 and oxidizer pump 12 are disposed.

It is to be noted that the hot gas resulting from combustion of the combustible mixture of decomposed hydrogen peroxide and hydrocarbon fuel in the combustor 14 contains substantially no nitrogen oxides, and flows out of the combustor 14 at high temperature (above 1500° C) and high velocity. By introducing hot gas from the combustor 14 into the main combustion chamber 18, air-fuel mixture in the main combustion chamber 18 may be burned completely and optimally under low temperature conditions of about 1000° to 1300° C. Gas discharged from the main combustion chamber 18 is substantially free of noxious pollutants such as $NO_x$, HC and CO which would be produced by incomplete combustion of fuel. In the particular embodiment shown in FIG. 1, hot gas from the main combustion chamber 18 is used for driving the engine (here a turbine) 20.

In the embodiment of FIG. 1, there are provided the reaction chamber 13 including the decomposing catalyst and the ignition means 17 in the combustor 14. However, either may be eliminated, if required, though it is preferred to provide both in order to obtain optimum results. Furthermore, the portion of the passageway 10 leading from the combustor 14 to the main combustion chamber 18 may be provided with a means for imparting turbulent movement to the hot gas passing therethrough, to promote as efficient combustion as possible. In the embodiment shown in FIG. 1, fuel from the source 15 is supplied into the combustor 14. However, it may be supplied from a separate system, and may be a fuel other than hydrocarbon, in either liquid or solid form. Or, the fuel to be supplied into the combustor 14 may be a gas such as hydrogen. Furthermore, the embodiment of FIG. 1 uses hydrogen peroxide as an oxidizer for sustaining combustion in the combustor 14. However, it will be appreciated that liquid oxygen or oxygen gas may be used as an oxidizer instead of hydrogen peroxide. Under such circumstances, the reaction chamber 13 is not required.

Figure 2:
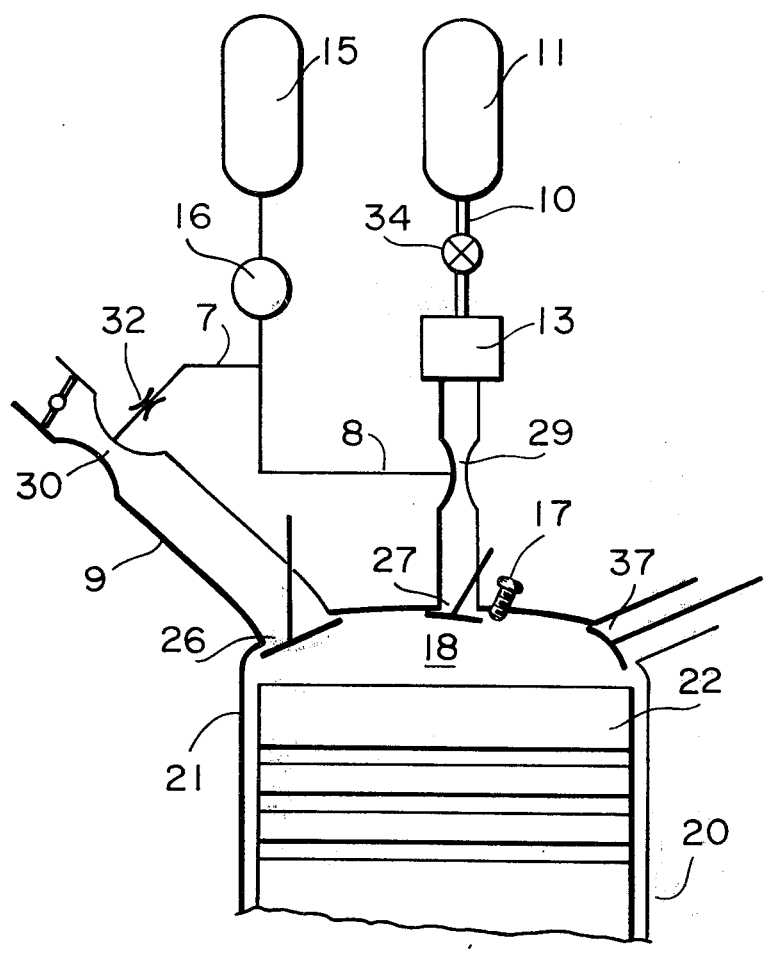
FIG. 2 is a diagrammatic view of a modification of the system of FIG. 1.

FIG. 2 shows the engine 20 as being a reciprocating piston internal combustion engine utilizing a modified form of the invention. The engine 20 includes a cylinder 21, and a piston 22 accommodated in the cylinder 21 for reciprocating movement therein in the usual manner. The combustion chamber 18 is defined by the cylinder 21 and the piston 22. The main and secondary induction passageways 9 and 10 respectively open into the combustion chamber 18 through valved main and secondary intake ports 26 and 27, provided substantially at the center and at one side of the cylinder 21, respectively.

The source of fuel 15 contains, for example, a hydrocarbon fuel. Fuel from the source 15 is supplied under pressure into a venturi section 29 in the secondary induction passageway 10, and into a venturi section 30 of the main induction passageway 9 by means of the fuel pump 16. The main induction passageway 9 which opens into the combustion chamber 18 through the intake port 26 is supplied with fuel through a flow control valve 32 in the passageway 7.

The source of oxidizer 11 may contain hydrogen peroxide as above. Hydrogen peroxide from in the source 11 is fed through a flow control valve 34 into the reaction chamber 13, in which the hydrogen peroxide is decomposed into $H_2O$ and ½ $O_2$ with the aid of the catalyst. The decomposed hydrogen peroxide gas is mixed with fuel from the source 15 and fed into the combustion chamber 18 through the secondary induction passageway 10 and the intake port 27. Air-fuel mixture from the main induction passageway 9 which is in communication with the atmosphere is fed into the combustion chamber 18 through the main intake port 26 at a relatively low air-fuel ratio due to the provision of the flow control valve 32.

The combustion chamber 18 is provided with the ignition means 17 in the vicinity of the secondary intake port 27.

A valved exhaust port 37 is provided at the other side of the cylinder 21 in the usual manner.

With the reciprocating piston internal combustion engine 20 above described, the mixture of decomposed hydrogen peroxide gas and the fuel is introduced into the combustion chamber 18 through the secondary intake port 27 under pressure due to expansion of the decomposed gas per se, and ignited by the ignition means 17. Combustion of this combustible mixture produces a temperature as high as 1500° C, but produces no noxious nitrogen oxides since no air is present. The heat produced by combustion of this rich secondary mixture is used to produce combustion of the leaner mixture which has been introduced through the main intake port 26. Combustion occurs in a laminar manner from top to bottom of the combustion chamber 18 as shown. Under these circumstances, combustion of the combustible mixture from the port 26 occurs at a relatively low temperature of between 1000° to 1300° C due to the leanness of this mixture, so that production of pollutants such as nitrogen oxides ($NO_x$), unburned hydrocarbons (HC) and carbon monoxide (CO) can be kept to a minimum.

Furthermore, by initially burning the richer upper layer of the combustible mixture from the port 27 which does not use air as an oxidizing agent, it will be possible to suppress production of noxious materials which would otherwise be generated at the initial stage of combustion. More particularly, with this laminar combustion, the production of nitrogen oxides can be reduced to 1/100 to 1/1000 of the level contained in exhaust gases from existing combustion engines of a similar type.

Figure 3:
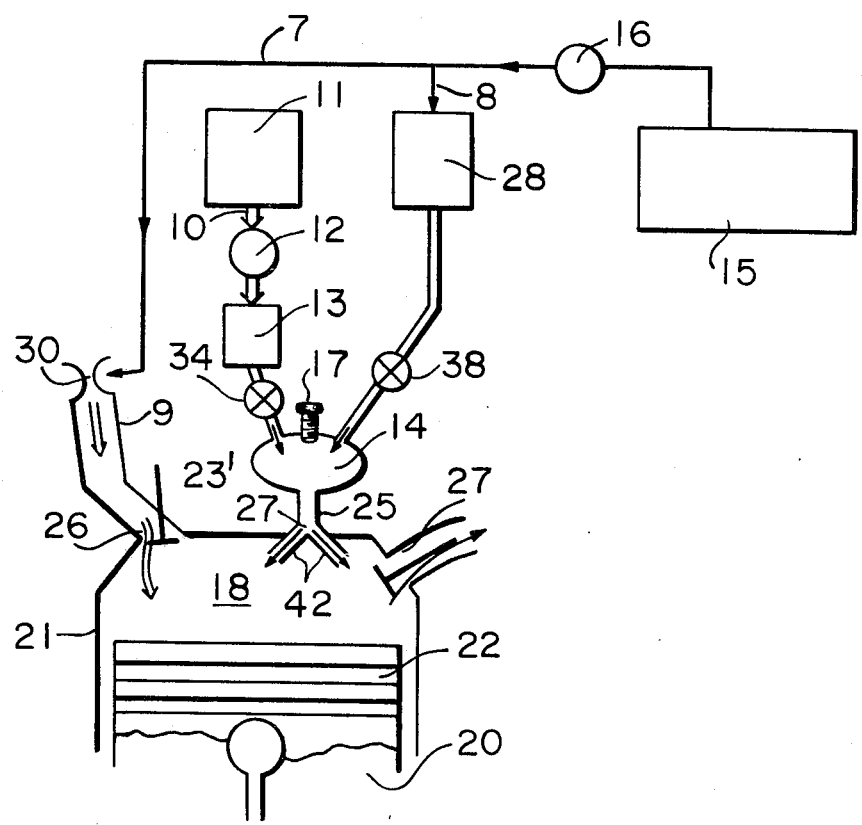
FIG. 3 is a diagrammatic view of another modification of the system of FIG. 1.

Referring to FIG. 3, which shows another modification of the invention, the system further includes in the secondary fuel supply passageway 8 a flow control valve 38. The valves 34 and 38 have are adapted to open during the intake stroke of the piston 22 so that hydrogen peroxide is fed under pressure from the source 11 into the combustor 14 by means of the pump 12 in a gaseous state, after decomposition in the chamber 13. Fuel is fed also under pressure into the combustor 14 by means of the pump 16 through an auxiliary fuel reservoir 28. Simultaneously, air-fuel mixture is introduced into the combustion chamber 18 of the engine through the valved intake port 26. The engine then commences its compression stroke, and near the top dead center position of the piston 22, the mixture in the combustor 14 is ignited by the ignition means 17. The hot gas produced in the combustor 14 flows at high velocity into the main combustion chamber 18 through nozzles 42, and ignites the air-fuel mixture in the combustion chamber 18 while imparting intense turbulent movement thereto. The flow control valves 34 and 38 are closed during the power stroke of the engine. In the succeeding exhaust stroke, the exhaust port 37 is opened to expel exhaust gas from the combustion chamber 18.

It will be appreciated that the effects of the present invention become more prominent when the arrangements of FIGS. 1 to 3 are employed in combination with means for accurately adjusting the air-fuel ratio of the combustible mixture entering the combustion chamber, means for injecting the air-fuel mixture into the combustion chamber in a laminar manner, or means for imparting eddying or vortex movement to the air-fuel mixture.

What is claimed is:

1. A combustion engine system having a main combustion chamber, comprising a combuster connected through a first passageway to said combustion chamber, a reaction chamber communicated with said combuster through a second passageway, a source of an oxidizing agent connected through a third passageway to said reaction chamber, a main passageway opening at one end thereof into said main combustion chamber and communicated at the other end thereof with the atmosphere, a fuel source, a first fuel passageway communicated with said main passageway at one end thereof, a second fuel passageway communicated with said combuster at one end thereof, and a third fuel passageway having one end connected with the other ends of said first and second fuel passageways and the other end thereof connected with said fuel source.

2. A combustion engine system according to claim 1, further comprising a pump disposed in said third passageway to supply the oxidizing agent from said source of an oxidizing agent to said reaction chamber.

3. A combustion engine system according to claim 2, further comprising a fuel pump which is disposed in said third fuel passageway for supplying the fuel from said fuel source to both of said main combustion chamber and said combuster.

4. A combustion engine system according to claim 3, further comprising a ignition means which is mounted in said combustor for igniting the combustible mixture in it.

5. A combustion engine system according to claim 4, in which said main passageway has therein an air compressor for supplying the air into said main combustion chamber.

6. A combustion engine system according to claim 3, in which said second fuel passageway is provided with an auxiliary fuel reservoir.

7. A combustion engine system according to claim 6, in which said first passageway is provided with a first flow control valve and said second fuel passageway is provided at the downstream of said auxiliary fuel reservoir with a second flow control valve.

8. A combustion engine system according to claim 4, in which said first passageway is provided with vortex means for imparting a vortex movement to an exhaust gas exhausted from said chamber.

* * * * *